United States Patent [19]
Ito et al.

[11] Patent Number: 5,711,368
[45] Date of Patent: Jan. 27, 1998

[54] AIR CONDITIONING APPARATUS FOR A VEHICLE

[75] Inventors: Koji Ito, Nagoya; Teruhiko Kameoka, Okazaki; Hisashi Tanaka; Yuichi Shirota, both of Anjo; Manabu Miyata, Kariya; Hikaru Sugi, Nagoya, all of Japan

[73] Assignee: Nippondenso Co., Ltd., Kariya, Japan

[21] Appl. No.: 675,597

[22] Filed: Jul. 3, 1996

[30] Foreign Application Priority Data

Jul. 6, 1995 [JP] Japan .................... 7-170970

[51] Int. Cl.$^6$ .................... F25B 29/00
[52] U.S. Cl. .................... 165/42; 165/43; 454/121; 454/156; 454/158; 237/12.3 A; 237/12.3 B
[58] Field of Search .................... 165/41, 42, 43; 454/121, 158, 156; 237/12.3 A, 12.3 B

[56] References Cited

U.S. PATENT DOCUMENTS

| | | |
|---|---|---|
| 2,213,018 | 8/1940 | Perkins . |
| 2,295,750 | 9/1942 | Norris . |
| 3,918,270 | 11/1975 | Dixon et al. . |
| 4,709,751 | 12/1987 | Ichimaru et al. . |
| 4,958,504 | 9/1990 | Ichikawa et al. . |
| 4,976,309 | 12/1990 | Averin .................... 454/156 |
| 5,012,859 | 5/1991 | Nakazawa et al. .................... 165/43 |
| 5,074,121 | 12/1991 | Morris . |
| 5,086,830 | 2/1992 | Heinle et al. . |

FOREIGN PATENT DOCUMENTS

| | | |
|---|---|---|
| 56-82628 | of 1981 | Japan . |
| 5-3365 | of 1993 | Japan . |
| 6-227592 | of 1994 | Japan . |
| 6-240362 | of 1994 | Japan . |
| 986663 | of 1965 | United Kingdom . |

*Primary Examiner*—John K. Ford
*Attorney, Agent, or Firm*—Harness, Dickey & Pierce

[57] ABSTRACT

An evaporator is disposed substantially horizontally at a central portion of an instrument panel in a passenger compartment, and air is blown, by a blower disposed so as to be shifted from the center of the evaporator, so as to flow through the evaporator from the bottom to the top. A heater core is disposed substantially horizontally above the evaporator, and an air outlet mode switching portion for switching an air outlet direction of air, temperature of which is adjusted by the heater core, is disposed above the heater core. Foot air ducts are provided to supply conditioned air, a flow direction of which has been switched by the air outlet mode switching portion, to foot air outlets opening to a foot area of the passenger, and passage portions passing through an outlet side path of a scroll casing of the blower are provided in the foot air duct. In this way, it is possible to reduce the space where the heat exchanger portion is installed.

12 Claims, 12 Drawing Sheets

FACE MODE

VEHICLE FRONT ⟷ VEHICLE REAR

B/L MODE

FOOT MODE

F/D MODE

DEF MODE

AIR CONDITIONING APPARATUS FOR A VEHICLE

CROSS REFERENCE TO RELATED APPLICATION

This application is based on and claims priority of Japanese Patent Application No. Hei. 7-170970 filed on Jul. 6, 1995.

BACKGROUND OF THE INVENTION

1. Field of the Invention

The present invention relates to an air conditioning apparatus for a vehicle, and more particularly, to an installation layout of an air conditioning unit, in which a heat exchanger for conditioning air to introduce blown air from a blower from a lower portion is installed at an angle proximate to substantially horizontal.

2. Description of Related Art

Recently, the need for downsizing an air conditioning unit for a vehicle has been demanded to enlarge the space of the passenger compartment. As for downsizing the air conditioning unit, a structure of a center-placed type, i.e., an air conditioning unit disposed in the center portion of the vehicle, in which a heater core and an evaporator for cooling are integrally disposed in a longitudinal direction of the vehicle and only a blower is disposed so as to be offset in the width direction from the center portion of the vehicle, has been proposed to downsize the air conditioning unit in the width direction of the vehicle (i.e., the right and left direction of the vehicle).

According to the layout for this center-placed type, since the heater core and the evaporator for cooling are installed concentratedly in the center portion of the vehicle, it is easy to ensure the space within the instrument panel. However, the heat exchanger for conditioning air (i.e., the evaporator or heater core) is disposed so as to stand substantially vertically in a narrow space in the vehicle-longitudinal direction, and therefore, it becomes necessary to install an air duct portion to introduce blown air from a blower at the vehicle-front side of the evaporator. Similarly, it becomes necessary to install an air duct portion to introduce blown air which has passed through the heater core at the vehicle-rear side of the heater core.

Thus, since air duct portions at the front and rear side of the evaporator and heater core are necessary, there causes a problem that the dimension in the vehicle-longitudinal direction becomes larger.

Additionally, since the dimension in the vehicle-longitudinal direction becomes larger, it may become difficult to provide a space on the vehicle-rear side of the heater core, in which an air outlet mode switching portion for switching an air outlet mode is installed. For this reason, an installation layout in which the air outlet mode switching portion is disposed above the heater core may be adopted, however, in this case, the air outlet mode switching portion is further installed above the heater core 22 standing vertically. Accordingly, there also causes a problem in which the dimension in the direction of height becomes larger.

As described above, the requirement for downsizing the air conditioning unit for a vehicle cannot adequately be satisfied, even with the layout of a center-placed type.

For this reason, the present applicant previously proposed, in Japanese patent Application No. 6-227592 and Japanese patent Application No. 6-240362, an air conditioning apparatus for a vehicle, capable of making space for a heat exchanger extremely small in the vertical direction by employing a layout in which both an evaporator and a heater core are disposed substantially horizontally so as to overlap one over the other. As a result, it is possible to sufficiently reduce the height dimension in comparison with the conventional center-placed unit.

However, in the air conditioning unit previously proposed by the Applicant, since the heater core is disposed substantially horizontally and air is blown from below to above the heater core, even though the air is heated by the heater core and flows toward the upper portion of the air conditioning unit, it is necessary to introduce the warm air from the upper portion of the air conditioning unit to a foot air outlet opening to a foot area of the passenger.

For this reason, when a foot air duct extending downwardly from the upper portion of the air conditioning unit is installed to introduce the warm air from the upper portion of the air conditioning unit through the foot air outlet to the foot area of the passenger, the foot air duct and the scroll casing of the blower interfere each other, and therefore the foot air duct must be installed with a bent state while avoiding the scroll casing of the blower.

As a result, by installing the foot air duct, downsizing the air-conditioning unit is obstructed, and further air flow resistance may be increased.

In the air conditioning apparatus for construction vehicles disclosed JP-Y2-5-3365, a layout in which an evaporator and a heater core are both disposed substantially horizontally, overlapping one above the other, has been proposed. However, in this air conditioning apparatus, a blower body is formed as a separate unit from the body of the air conditioning apparatus in which the evaporator and heater core are incorporated, an inlet port and an outlet port of the blower body are connected to the body of the air conditioning apparatus in reversed directions during the cooling operation and during the heating operation, and air is blown from below to above within the body of the air conditioning apparatus during the cooling operation and from above to below within the body of the air conditioning apparatus during the heating operation.

Therefore, since an extremely complicated work for attaching and detaching by hand is required to switch the direction of connection of the inlet port and outlet port of the blower body between the cooling operation and the heating operation with respect to the body of the air conditioning unit, there causes a problem that the operation of the air conditioning apparatus is markedly impeded, thus making it impossible to apply to a vehicle such as a passenger car or the like.

SUMMARY OF THE INVENTION

Accordingly, in view of the foregoing points, it is an object of the present invention to provide an air-conditioning apparatus for a vehicle, in which a heat exchanger for conditioning air, at least a heat exchanger for heating (heater core) is disposed substantially horizontally so as to blow air from below to above the heat exchanger for heating, capable of downsizing an air conditioning unit and reducing air flow resistance more effectively with a simple structure.

An air conditioning apparatus for a vehicle having a passenger compartment, according to the present invention, includes a blower for blowing conditioned air, a heating heat exchanger disposed substantially horizontally, into which blown air blown by the blower is introduced from a lower side thereof, for heating and discharging the blown air upwardly, a foot air outlet opened to a foot area in the passenger compartment to supply conditioned air thereto, and a foot air duct to introduce the conditioned air heated by the heating heat exchanger from an upper portion of the heating heat exchanger to the foot air outlet. The foot air duct includes a passage portion passing through an outlet side path of the blower.

In this way, since the heating heat exchanger is disposed substantially horizontally, the blown air is introduced from the lower side, and the air is introduced out upwardly, and therefore, a dimension of the air conditioning apparatus in the vehicle-longitudinal direction can be greatly reduced without an air duct portion in the vehicle-longitudinal direction of the air conditioning apparatus.

Additionally, since the space for the heat exchanger portion in the vertical direction can be simultaneously reduced, it is easy to mount the air conditioning apparatus in the vehicle.

Furthermore, since the foot air duct are provided to introduce conditioned air heated by the heating heat exchanger from an upper portion of the heating heat exchanger to lower foot air outlets, and passage portions formed to pass through an outlet side path of the blower are disposed in these foot air ducts, it is not necessary for the foot-vent ducts which extend downwardly from the upper portion of the heating heat exchanger to be so disposed as to bypass the outlet side path of the blower, and the foot air ducts can be disposed substantially straight downwardly. As a result thereof, increase in air flow resistance of the foot air ducts can be suppressed to a minimum.

When an outlet mode switching portion is disposed above a heating heat exchanger to switch an air flow direction of air heated by the heating heat exchanger, the extremely bothersome detaching work by hand is not necessary and the air blowing direction can be easily switched. Moreover, since the space for the heat-exchanger portion in the vertical direction can be reduced, the overall vertical dimension of the air conditioning apparatus can be suppressed to a small value, even when the air outlet mode switching portion is disposed above the heating heat exchanger.

When the passage portion of the foot air duct is so formed as to have a cross sectional shape having a streamline shape along flow of blown air from the blower, the air flow resistance of the air passing through the passage portion can be greatly suppressed, and blown air can flow smoothly.

Further, when the passage portion of the foot air duct so is formed as to have a cross sectional shape which becomes a tongue portion of the scroll casing, dynamic pressure can more favorably be converted to a static-pressure component by the tongue portion of the passage portion. For this reason, sudden enlargement loss at the outlet-side path of the scroll casing is suppressed and an adverse influence on blowing performance can be minimized.

Still further, when the passage portion of the foot air duct is formed in at least double-layer duct structures and a heat insulating air layer is formed in an intermediate portion of the double-layer duct structures, the heat transfer coefficient at the duct walls of the passage portion can be lowered, and heat exchange between hot air flowing through the passage portions and low-temperature air flowing through the outlet side path of the scroll casing can be suppressed to a minute amount, and thereby the decrease of the temperature of hot air blown to the passenger feet can be suppressed.

BRIEF DESCRIPTION OF THE DRAWINGS

Additional objects and advantages of the present invention will be more readily apparent from the following detailed description of preferred embodiments thereof when taken together with the accompanying drawings in which.

DETAILED DESCRIPTION OF THE PREFERRED EMBODIMENTS

Embodiments of the present invention will be described hereinafter with reference to the drawings.

A first embodiment of the present invention will be described with reference to FIG. 1 to FIG. 12.

Figure 1:
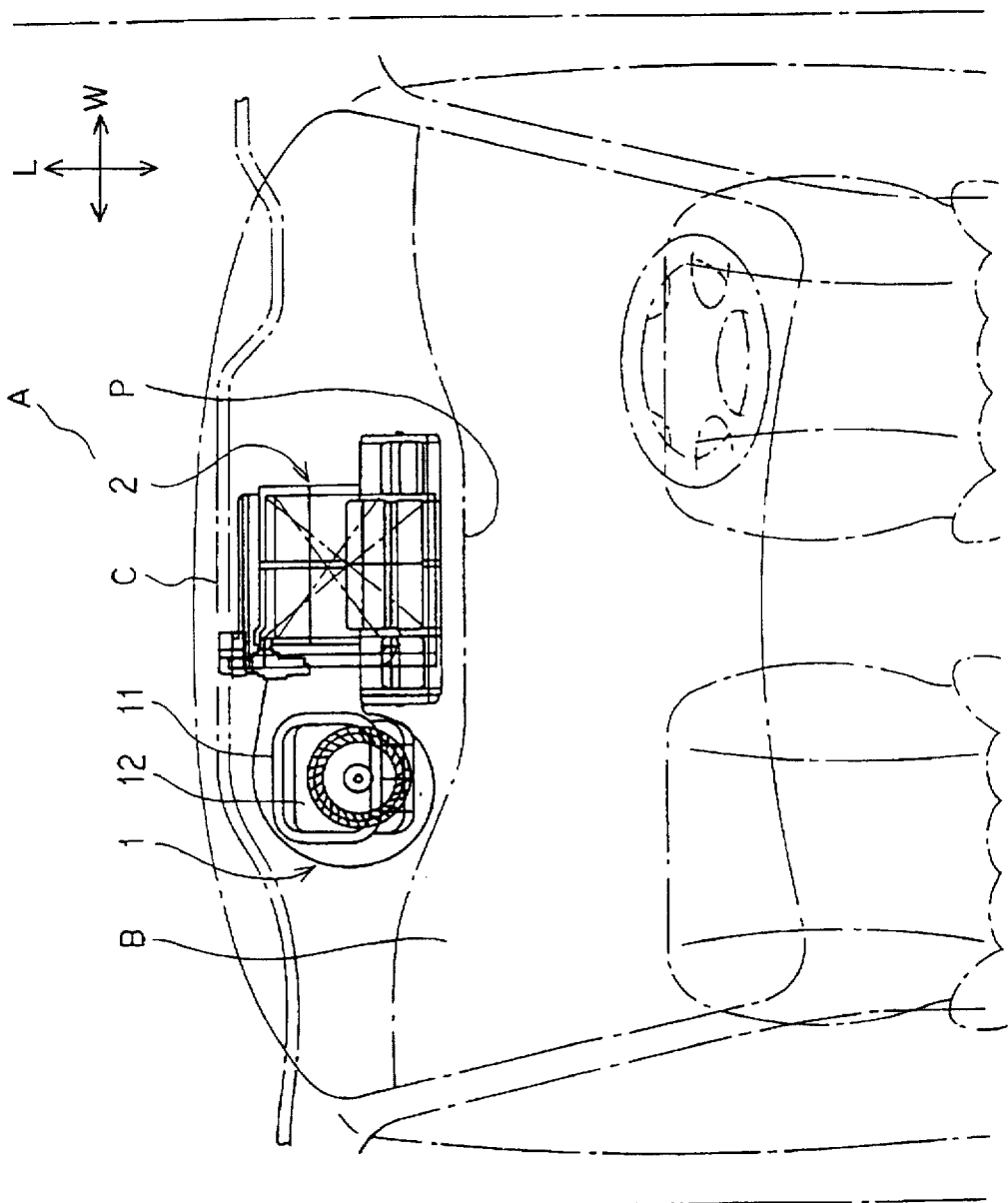
FIG. 1 is a schematic plan view indicating a state wherein an apparatus according to a first embodiment of the present invention is mounted in a vehicle.
Figure 2:
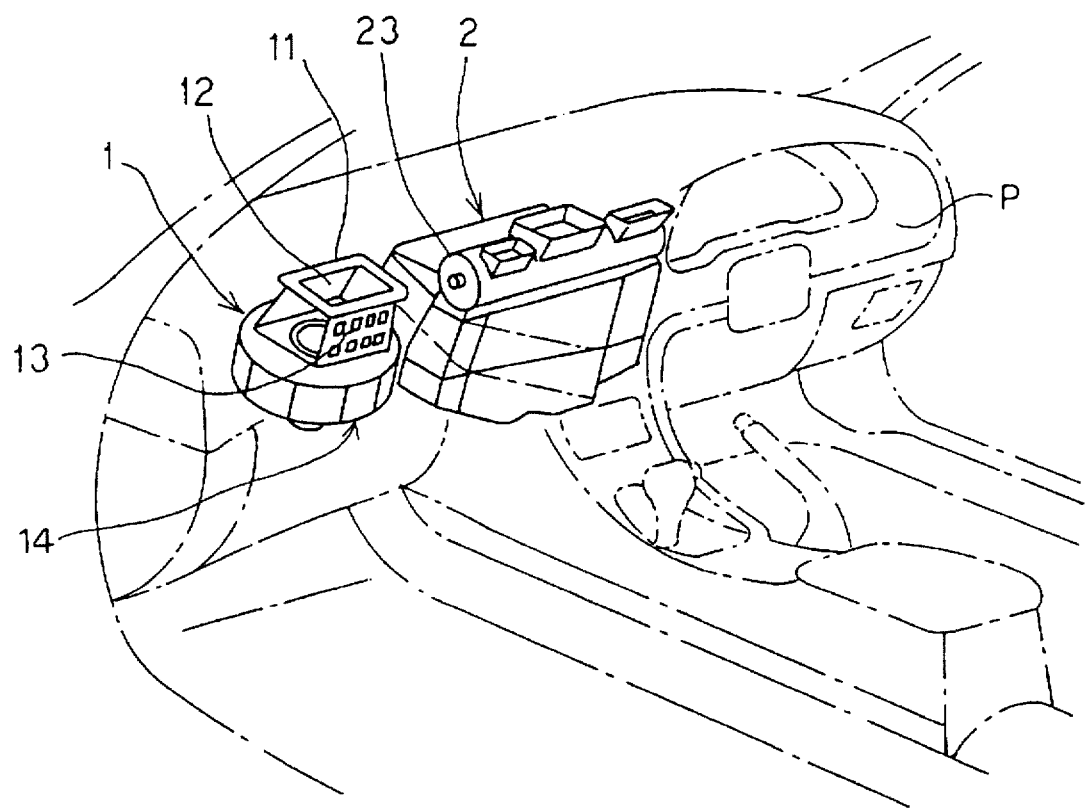
FIG. 2 is a schematic perspective view indicating a state wherein the apparatus according to the first embodiment of the present invention is mounted in a vehicle.

In FIGS. 1 and 2, an engine compartment A and passenger compartment B of a vehicle are separated by a partition plate C (generally referred to as a firewall, and made of sheet steel). Accordingly, a blower unit 1 of an air conditioning apparatus is disposed in a manner to be shifted in a vehicle-width direction W (in a right-hand drive vehicle, shifted to the left-hand side of the vehicle-width direction W) from a central portion of an instrument panel p within the passenger compartment B. In the drawings, L indicates a vehicle-longitudinal direction, H indicates a vehicle-height direction, and M (see FIG. 3 and FIG. 4) indicates a central position of the vehicle-width direction W. The upper side of arrow L in FIG. 1 is the front (engine-compartment) side of the vehicle, and the lower side of arrow L is the rear side of the vehicle.

The blower unit i includes an inside/outside air switching box 11 to switch and introduce the inside air in the passenger compartment inner air or the outside air outside the passenger compartment outer air. An outside air inlet port 12 and an inside air inlet port 13 are opened in the inside/outside air switching box 11, and an inner/outer air switching door (not illustrated) to open and close these two inlet ports 12 and 13 is installed inside the inside/outside air switching box 11. Additionally, a filter member 11a (see FIG. 4) to remove dust or the like from air introduced from the outside air inlet port 12 and inside air inlet port 13 is incorporated within the inside/outside air switching box 11.

Figure 4:
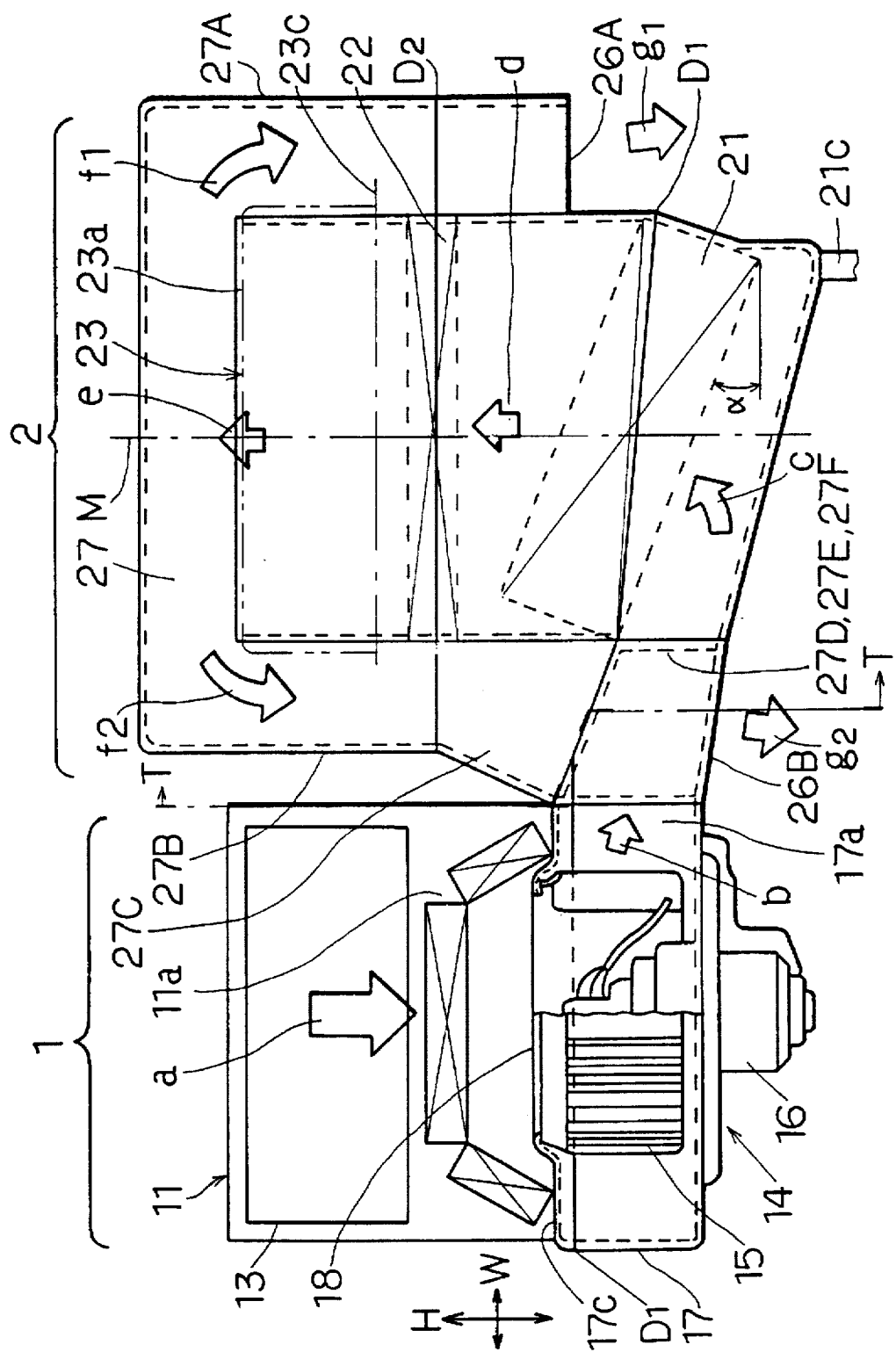
FIG. 4 is a partially cutaway front view of FIG. 1.
Figure 6:
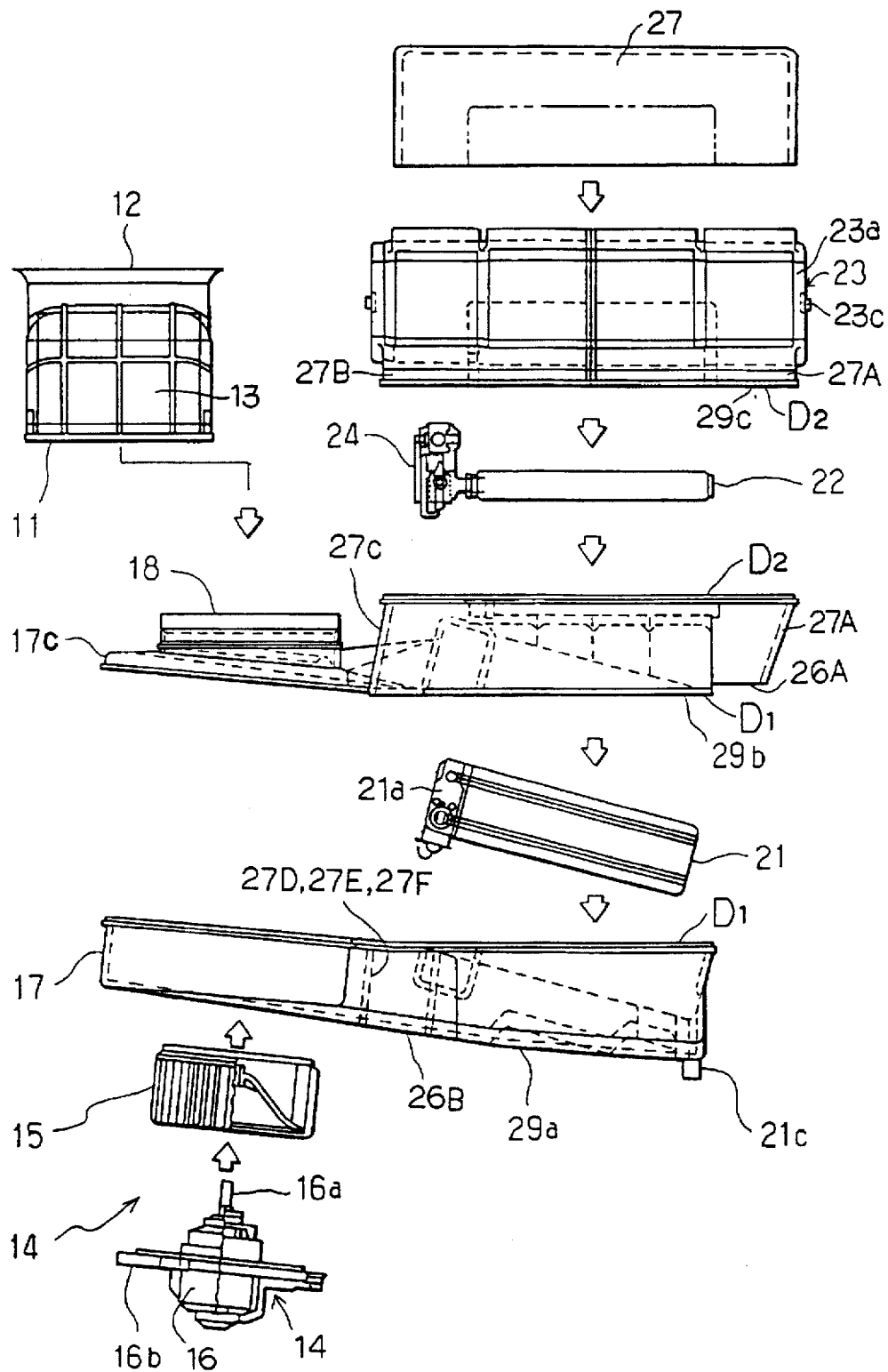
FIG. 6 is an exploded view of a method for assembling the apparatus according to the first embodiment.

A blower 14 is disposed below the inside/outside air switching box 11, as shown in FIG. 4 and FIG. 6. The blower 14 is composed of a centrifugal-type multiple-vane fan (scirocco fan) 15, a motor 16 for driving fan, and a scroll casing 17. An upper cover portion 17c is assembled to the scroll casing 17, as shown in FIG. 6, and a bellmouth-shaped intake port 18 is provided in the upper cover portion 17c.

A rotating shaft 16a (FIG. 6) of the fan 15 is disposed substantially vertically. Air is sucked by rotation of the fan 15 from the inside/outside air switching box 11 through the filter member 11a, and passes through the bellmouth-shaped intake port 18 on the upper portion of the scroll casing 17, so that the air is blown substantially horizontally (from the left-hand side of the passenger compartment B toward the right-hand side, as is understood from FIG. 1) toward an outlet in the scroll casing 17.

Meanwhile, an air conditioning unit 2, into which a heat exchanger for conditioning air (described later) is incorporated, is disposed at a central portion in the vehicle-width direction W of the instrument panel p within the passenger compartment B. An evaporator (heat exchanger for cooling) 21 of a refrigeration cycle is disposed in a substantially horizontal state in the air conditioning unit 2, so that air which is blown by the above-described blower unit 1 flows thereinto from a lower side.

Accordingly, a heater core (heat exchanger for heating) 22 is installed in a substantially horizontal state on an air downstream side of the evaporator 21. The heater core 22 employs engine coolant water (hot water) as a heating source. Accordingly, an air outlet mode switching portion 23 is disposed in an upper portion (air-downstream side) of the heater core 22 within the passenger compartment.

In this embodiment, a hot-water control valve 24 (see FIG. 6) is employed to control hot-water flow to the heater core 22 as a device for controlling temperature of conditioned air. Hot-water flow to the heater core 22 is controlled by the hot-water control valve 24, so as to regulate the amount of air heating by the heater core 22, thus controlling the temperature of air introduced into the passenger compartment.

The air outlet mode switching portion 23 is for switching the air outlet mode to the passenger compartment, and is provided with a face air duct 25 communicated with a face (upper) air outlet (not illustrated) to supply air toward the head of a passenger in the passenger compartment, a foot air duct 27, and a defroster air duct 28 communicated with a defroster air outlet (not illustrated) to supply air toward an inner surface of the windshield.

The foot air duct 27 is positioned at an upper portion of the air outlet mode switching portion 23 on the engine-front side (engine-compartment side), and at both ends in the vehicle-width direction W thereof, is branched into two ducts, i.e., a driver-seat-side foot air duct 27A and a passenger-seat-side foot air duct 27B. At each lower end thereof, a driver-seat-side foot air outlet 26A or a passenger-seat-side foot air outlet 26B is opened to blow air toward the foot area of the passenger in the passenger compartment.

Accordingly, the air outlet mode switching portion 23 switches these plurality of air ducts 25, 27, and 28 open and closed by door means (a plate-like door, a rotary door having an arc-shaped outer peripheral surface, and a film door).

As the air outlet mode switching portion 23 may be of a known structure, detailed description thereof is omitted, however, in this present embodiment, as shown in FIG. 5 and FIGS. 8 to 12, the air outlet mode switching portion 23 is formed such that an upper portion of a resin upper case 29c (see FIG. 5 and FIG. 6) of the air conditioning unit 2, having an arc-shaped cross section, with a rotary door 23a rotatably installed therein. The rotary door 23a is formed of resin or the like in a shape having an arc-shaped peripheral surface to which an air passage opening 23b is opened, so as to rotates with a shaft portion 23c as the center. The shaft portion 23c is rotatably supported in a bearing hole (not illustrated) provided in the resin upper case 29c of the air conditioning unit 2.

Figure 8:
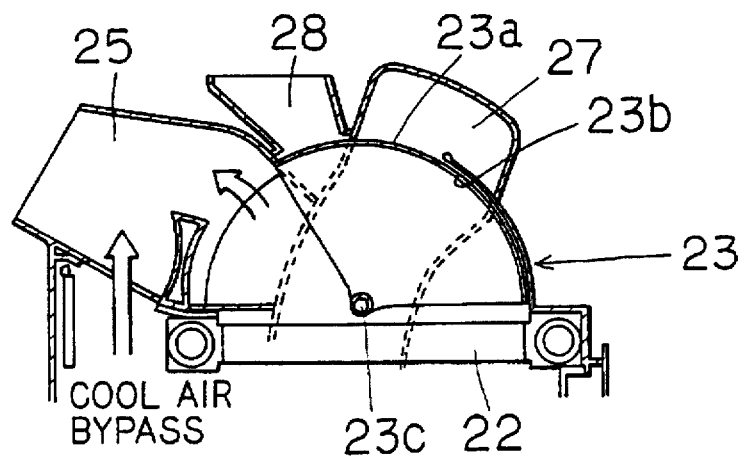
FIG. 8 is a cross sectional view of a mode-switching portion indicating a face air outlet mode state according to the first embodiment.
Figure 9:
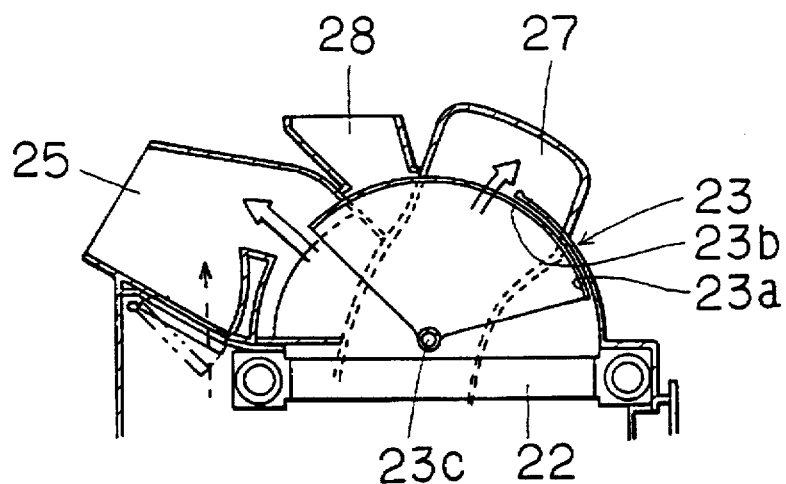
FIG. 9 is a cross sectional view of a mode-switching portion indicating a bi-level air outlet mode state according to the first embodiment.
Figure 10:
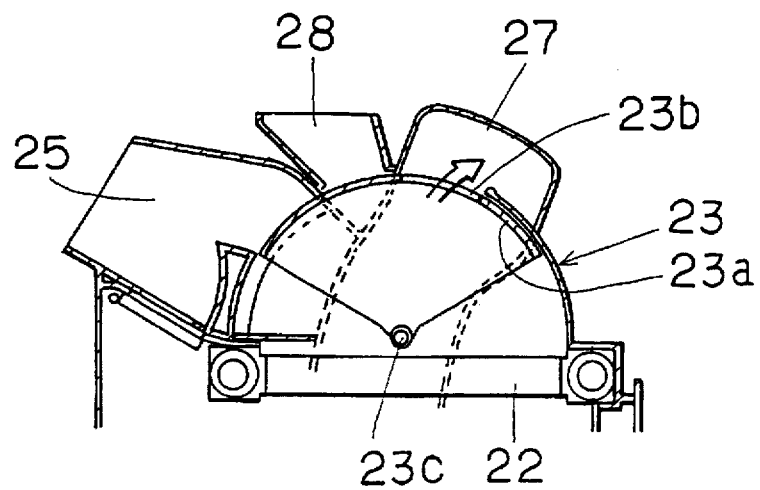
FIG. 10 is a cross sectional view of a mode-switching portion indicating a foot air outlet mode state according to the first embodiment.
Figure 11:
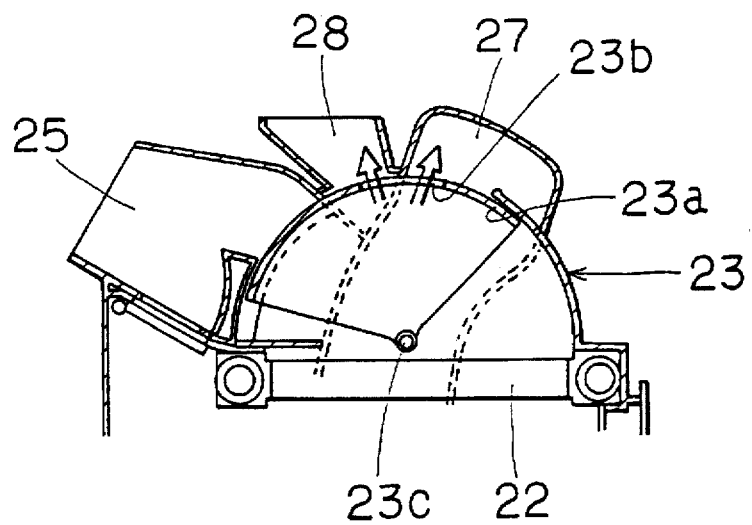
FIG. 11 is a cross sectional view of a mode-switching portion indicating a foot/defroster air outlet mode state according to the first embodiment.
Figure 12:
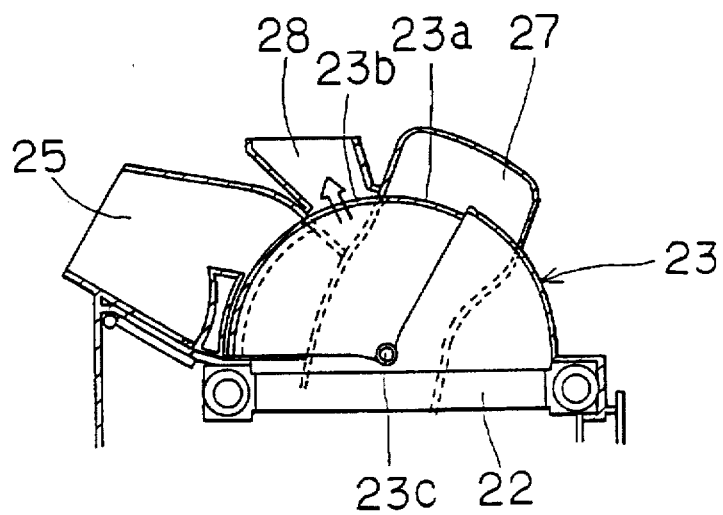
FIG. 12 is a cross sectional view of a mode-switching portion indicating a defroster air outlet mode state according to the first embodiment.

Accordingly, the plurality of air ducts 25, 27, and 28 are switched to be opened or closed by selection of the rotating position of this rotary door 23a, such that a plurality of known air outlet modes including a face (FACE) air outlet mode shown in FIG. 8, a bi-level (B/L) mode shown in FIG. 9, a foot (FOOT) air outlet mode shown in FIG. 10, a dual foot/defroster (F/D) air outlet mode shown in FIG. 11, a defroster (DEF) air outlet mode shown in FIG. 12, and so on, can be switched.

According to this embodiment, of the driver-seat-side foot air duct 27A and passenger-seat-side foot air duct 27B extending downwardly from both ends in the vehicle-width direction W of the foot air duct 27 disposed on the upper portion of the air outlet mode switching portion 23, the passenger-seat-side foot air duct 27B is installed with the following characteristics.

Namely, the passenger-seat-side foot air duct 27B extending downwardly includes a tapered expanding portion 27C at a middle portion thereof, and a cross sectional area of the tapered expanding portion 27C gradually expands. The tapered expanding portion 27C is branched into a plurality (three in this embodiment) of passage portions 27D, 27E, and 27F at a lower portion thereof. The above-described passenger-seat-side foot air duct 27B is opened at respective tip ends of these passage portions 27D, 27E, and 27F.

Figure 7A:
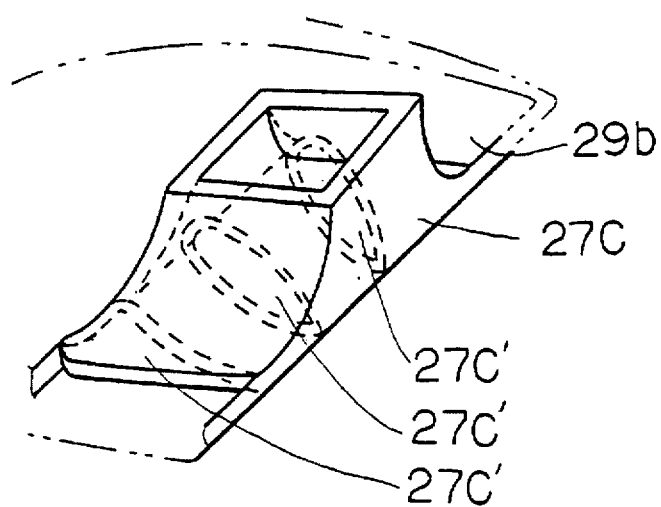
FIG. 7 is an essential perspective view of the apparatus according to the first embodiment.

As shown in the enlarged view in FIG. 7A, the tapered expanding portion 27C includes a closed surface having three open portions 27C', 27C', and 27C'at a lower tip end thereof, so that upper ends of the passage portions 27D, 27E, and 27F are communicated (see FIG. 5) with these three open portions 27C', 27C', and 27C', respectively.

Figure 3:
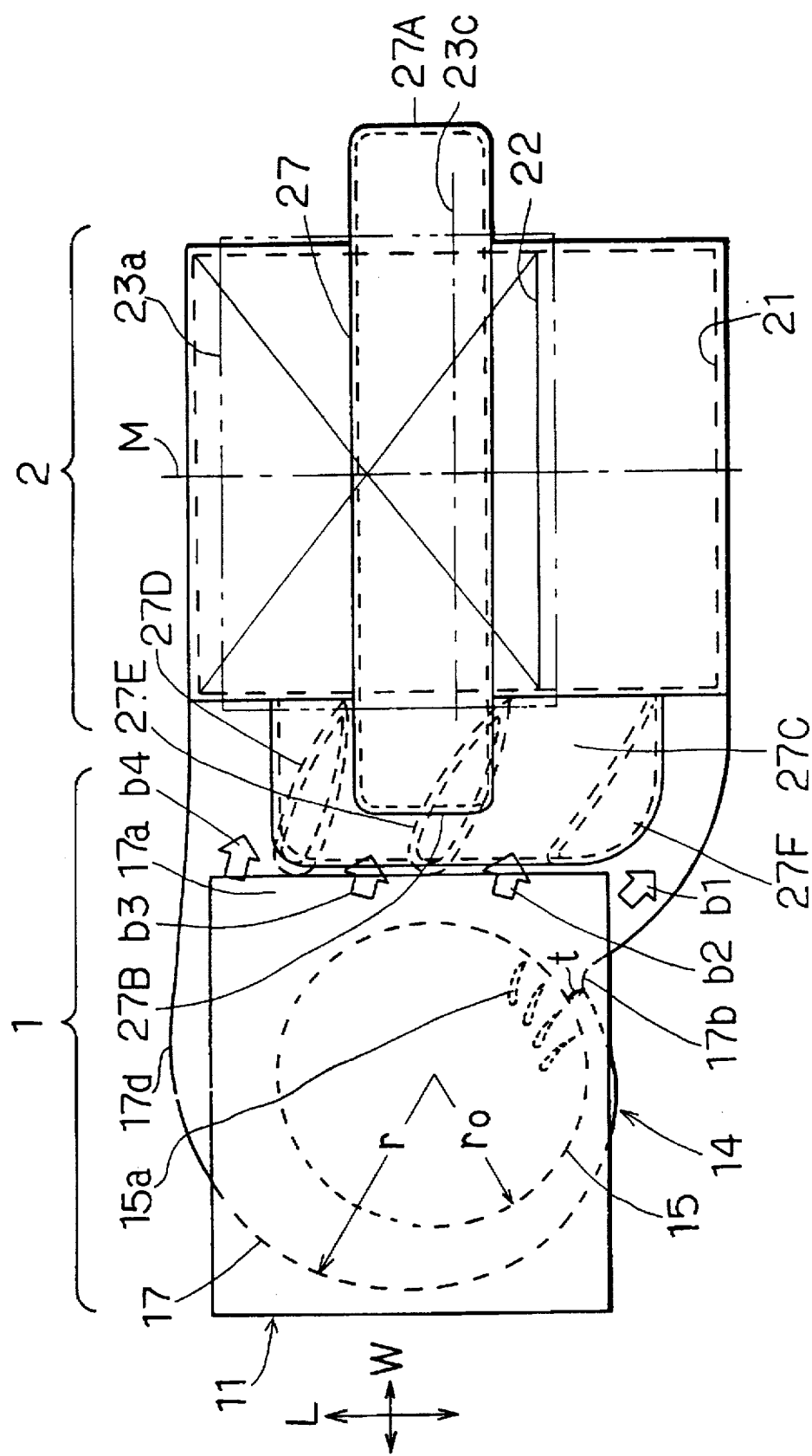
FIG. 3 is a plan view of the first embodiment of the present invention.
Figure 5:
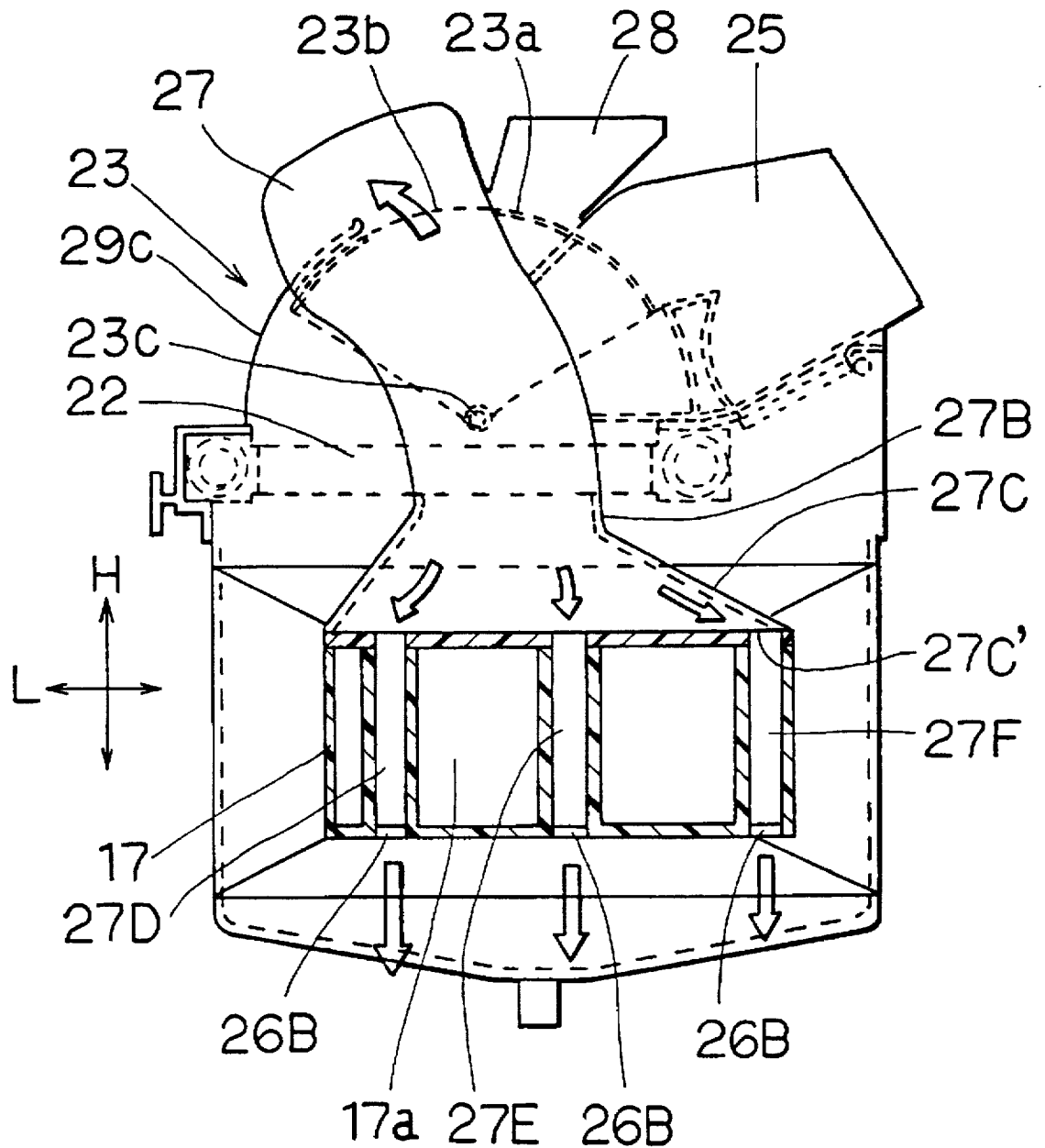
FIG. 5 is a cross sectional view taken along line V—V of FIG. 4.
Figure 7B:
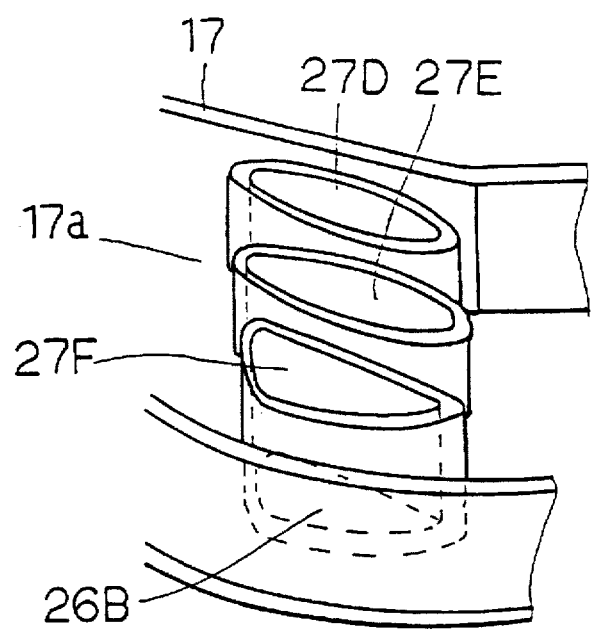

Accordingly, each of passage portions 27D, 27E, and 27F is provided to pass through an outlet side path 17a of the scroll casing 17 of the blower 14, as shown in FIG. 3, FIG. 5, and FIG. 7B. Each of passage portions 27D, 27E, and 27F is formed so as to have a cross section having a streamline shape along air flowing through the outlet side path 17a of the scroll casing 17.

The scroll casing 17 is formed in a logarithmic-spiral shape in which a tongue portion (nose portion) 17b thereof is taken as an origin, as shown in FIG. 3. The range in which the logarithmic-spiral shape is formed (a winding-angle range from the tongue portion 17b to a location 17b at which the logarithmic-spiral shape ends) is established at 240° to 270°.

The tongue portion 17b is positioned at a location spreading by a predetermined angle from a reference circle of logarithmic-spiral shape. A gap "t" of a minute amount is provided between the tongue portion 17b and the other diameter of the centrifugal fan 15, and the gap "t" is normally of a size approximately 10% of the outer diameter of the centrifugal fan 15. A radial-type or turbo-type centrifugal fan having a high static-pressure component is employed as the centrifugal fan 15, and the centrifugal fan 15 includes a vane having a substantially arc-shaped cross section.

Herein, the logarithmic-spiral shape of the scroll casing 17 is expressed by a configuration having a radius r according to the following equation (1).

$$r = r_0 \cdot \exp(n \cdot \theta) \quad (1)$$

wherein, r0: Radius of the centrifugal fan 15 n: Expansion ratio of the logarithmic-spiral shape

θ: predetermined winding angle from the reference circle of logarithmic-spiral shape The outlet side path 17a of the scroll casing 17 is formed in a shape expanding in the vehicle-longitudinal direction L by expressing the logarithmic-spiral shape of the scroll casing 17 with a shape having the radius r, and as a result, the outlet side path 17a of the scroll casing 17 can be smoothly connected to an inlet side air path of the evaporator, a length L of which in the vehicle-longitudinal direction is sufficiently larger than that of the blower 14, as shown in FIG. 3.

A temperature-operating type expansion valve 21a (FIG. 6) is provided in the evaporator 21 as a device for reducing pressure to decompress and expand the refrigerant flowing thereinto.

Additionally, the evaporator 21 is disposed in a manner to be slightly inclined from the horizontal plane to improve discharge performance of condensed water generated by cooling action. That is, the evaporator 21 is disposed in a manner to be inclined downwardly toward a front side (the right-hand side of FIG. 4) of the air blown by the blower on a lower side of the evaporator, as shown in FIG. 4.

It is preferable for the inclination angle α (FIG. 4) of the evaporator 21 to be in a range of 10° to 30°, and more preferably approximately 10°, so that an amount of water held by the evaporator 21 itself becomes smaller.

Furthermore, a tube (not illustrated) of the evaporator 21 is disposed so as to extend in a direction identical to a blowing direction (a direction from the left-hand side to the right-hand side of FIG. 4) of the blown air, and thereby the condensed water is compressed by the blown air on the surface of the tube and is smoothly shifted to an inclination advance end (a right-hand end portion in FIG. 4).

The condensed water generated by the evaporator 21 is discharged from a condensed liquid discharge pipe 21c provided at a lower location of the inclination advance end of the evaporator 21 at a lower end (air upstream side) of the evaporator 21. The pipe 21c is integrally formed at a lowest portion of a resin lower case 29a (FIG. 6).

FIG. 6 shows an assembly structure of the apparatus in this embodiment. The fan 15 of the blower 15, after being integrally joined to the rotating shaft 16a of the motor 16, is disposed within the scroll casing 17 integrally formed in the resin lower case 29a, and the motor 16 is installed and fixed to the scroll casing 17 by a flange portion 16b thereof.

The evaporator 21 is mounted on a mounting surface of the lower case 29a, and by sandwiching from the upper side with a resin middle case 29b, is fixed between the two cases 29a and 29b.

The bellmouth-shaped intake port 18 is opened in the upper-cover portion 17c of the scroll casing 17 integrally formed with the middle case 29b, and the inside/outside air switching box 11 is disposed above this bellmouth-shaped intake port 18 and is integrally installed with the scroll casing.

The heater core 22 and the hot-water control valve 24 are mounted on a mounting surface of the middle case 29b, and by sandwiching from the upper side with the resin upper case 29c, are fixed between the two cases 29b and 29c.

The air outlet mode switching portion 23 is disposed on the upper case 29c, and the rotary door 23a is incorporated therewithin. Additionally, the resin foot air duct 27 formed as a separate body is joined to the upper case 29c. Similarly, although not illustrated in FIG. 6, the face air duct 25 and defroster air duct 28, which are made of resin and formed as separate bodies, are joined to the upper case 29c.

Each of the cases 29a, 29b, and 29c, air ducts 25, 28, and 28, and inner/outer air-switching box 11 is detachably connected by metal clips having resiliency, screws, or the like.

Further in FIG. 4 and FIG. 6, $D_1$ is a separated surface between the lower case 29a and middle case 29b, and $D_1$ is a separated surface between the middle case 29b and upper case 29c.

Next, an operation of the present embodiment of the above structure will be described.

In FIG. 2, air (arrow a in FIG. 4) which has flowed from the inside/outside air switching box 11 flows substantially horizontally (arrows b and $b_1$ through $b_4$) in FIG. 3 and FIG. 4) within the scroll casing 17 by the blower fan 15, passes among the three passage portions 27D, 27E, and 27F of the passenger-seat-side foot air duct 27B in the outlet side path 17a of the scroll casing 17, and flows into the lower portion of the evaporator 21 as shown by arrow c in FIG. 4. Accordingly, the blown air, after being dehumidified and cooled by the evaporator 21, flows further upwardly (arrow d), is introduced into the heater core 22, and is heated thereat.

In this embodiment, the hot water control valve 24 to control hot water flow to the heater core 22 is employed as a device for controlling temperature of conditioned air, and so-called a flow-regulating reheating method to obtain a desired outlet air temperature by regulating hot-water flow at this hot-water control valve 24 is employed. Accordingly, conditioned air reheated to the desired temperature by heater core 22 flows into the air outlet mode switching portion 23 of the upper-case 29c portion, as shown by arrow e, and thereat is distributed by the rotary door 23a to the predetermined ducts, as shown in FIGS. 8–12.

Air which has flowed into the heater air duct 27 is branched into two flows in the vehicle-width direction W indicated by arrow $f_1$ and arrow $f_2$. One flow $f_1$ passes through the driver-seat-side foot air duct 27A and is blown from the driver-seat-side foot air outlet 26A to the driver-seat foot area as indicated by arrow $g_1$.

Additionally, the other flow $f_2$ passes through the passenger-seat-side foot air duct 27B, the tapered expanding portion 27C, and further the three passage portions 27D, 27E, and 27F, and is blown from the passenger-seat-side foot air outlet 26B to the passenger-seat foot area as indicated by arrow g$_2$.

According to this embodiment, the above operation is performed by the above-described structure, and the following effect can be obtained.

The evaporator 21 and heater core 22 are both disposed substantially horizontally in a layout in which one is overlapping above the other, so that blown air is introduced from a lower side of these heat exchangers and air is taken out from an upper side, and therefore a blown-air duct portion in the vehicle-longitudinal direction L of the air conditioning unit 2 is not required, and the dimension of the vehicle-longitudinal direction L of the air conditioning unit 2 can be greatly reduced.

Additionally, since vertical space for the heat-exchanger portion can be reduced simultaneously, it becomes easy to mount the air conditioning unit 2 in a vehicle.

As shown in FIG. 6, most components of the air conditioning apparatus are so formed as to be assembled vertically, and in the production, it becomes possible to assemble the air conditioning apparatus by stacking in one direction from the bottom to the top, and the number of assembling work can be reduced.

The evaporator 21 is inclined downwardly toward a front side of the air flow direction of air blown downwardly therefrom, and the tube of the evaporator 21 is also arranged in the air flow direction (the left-hand and right-hand directions in FIG. 3 and FIG. 4), and therefore, condensed water on the surface of the tube is pushed by the blown air, smoothly gathers at the inclination advance end (the right-side end in FIG. 4) of the evaporator 21, and falls.

Accordingly, condensed water is discharged to an external portion from a condensed liquid discharge pipe 21c provided below the inclination advance end of the evaporator 21. For this reason, condensed water can smoothly be discharged from the evaporator 21.

Since the condensed water from the evaporator 21 flows and falls to an air upstream side, the falling condensed water is warmed by high-temperature blown air before cooled. Consequently, the outer-surface temperature of the lower case 29a does not drop greatly, and therefore, the frost of the lower case 29a is greatly reduced or is eliminated, an insulator (heat-insulating material) which is ordinarily fitted on an inner side of the case can be eliminated, and the cost can be further reduced.

Moreover, according to the devised installation of the heater air duct system in this embodiment, the following effect can be obtained.

According to the present embodiment, the passenger-seat-side foot air duct 27B is branched by the tapered expanding portion 27C into the three passage portions 27D, 27E, and 27F, the passenger-seat-side foot air duct 27B is opened at each of the tip end portions of these passage portions 27D, 27E, and 27F, and each of the passage portions 27D, 27E, and 27F is disposed to pass through the outlet side path 17a of the scroll casing 17 of the blower 14, and the passenger-seat-side foot air duct 27B can be disposed substantially straight downwardly from the end portion of the foot air duct 27 provided on the upper portion of the air outlet mode switching portion 23.

As a result, air flow resistance of the passenger-seat-side foot air duct 27B can be reduced, similarly to the driver-seat-side foot air duct 27A.

Furthermore, since each of the passage portions 27D, 27E, and 27F is formed so as to have a cross-section having a streamline shape along air flowing through the outlet side path 17a of the scroll casing 17, the increase in air flow resistance of the path 17a by passing through each of the passage portions 27D, 27E, and 27F can be suppressed to a minimum.

Moreover, by establishing intervals of the separate three passage portions 27D, 27E, and 27F so that air flow ratio to the evaporator 21 becomes substantially uniform, uniformity of air flowing to the entire surface of the evaporator 21 can be obtained, and cooling capacity of the evaporator 21 can be improved.

A second embodiment of the present invention will be described.

Figure 13:
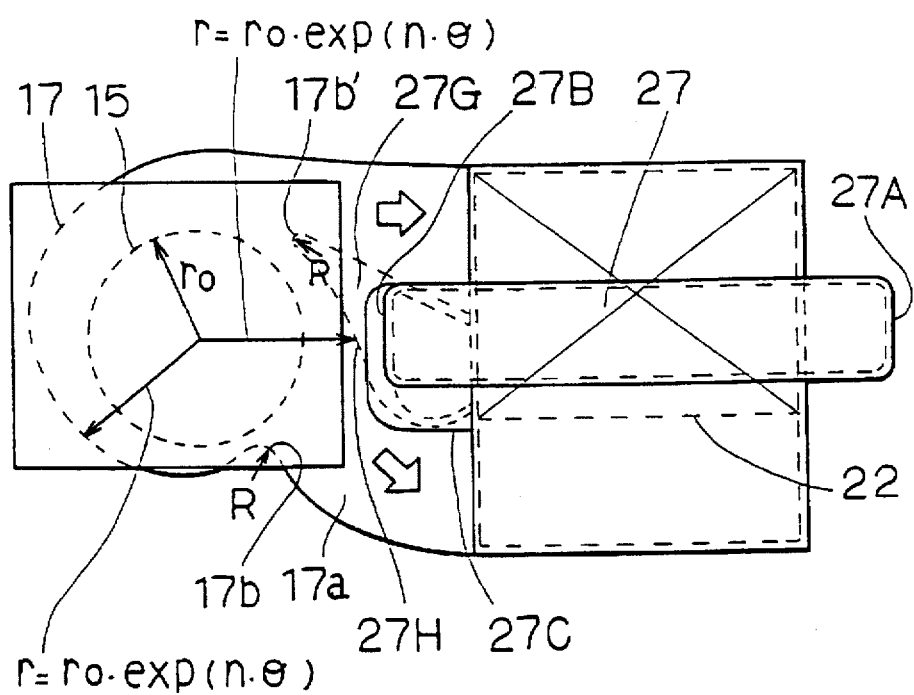
FIG. 13 is a plan view indicating a second embodiment according to the present invention.

FIG. 13 corresponds to FIG. 3 of the first embodiment; according to a second embodiment, a single passage portion 27G is provided as a passage portion communicating with the tapered expanding portion 27C disposed intermediately in the passenger-seat-side foot air duct 27B. The single passage portion 27G is disposed to pass through the outlet side path 17a of the scroll casing 17, and the passenger-seat-side foot air outlet 26B is opened at an tip end (lower-end) portion thereof.

According to the second embodiment, the passage portion 27G is formed so as to have a cross section having a streamline configuration along air flowing through the outlet side path 17a, and also the passage portion 27G is formed so as to have a cross section functioning as a scroll tongue portion of the scroll casing 17.

That is, a shape of the tip end portion of an air-upstream side of the passage portion 27G is formed in an arc shape having a radius R identical to a radius of curvature R of the tongue portion 17b, and a surface 27H of the passage portion 27G, a surface 27H of which faces an outer peripheral surface of the centrifugal fan 15, is formed in an identical logarithmic-spiral shape as the scroll casing 17 (i.e., a logarithmic-spiral shape having a radius r expressed by the above-described equation (1)).

By forming the passage portion 27G in this way, the tip portion of the passage portion 27G functions as a second tongue portion 17b', and therefore, dynamic pressure of blown air having a high dynamic-pressure component discharged from the centrifugal fan 15 can be converted more favorably to a static-pressure component by the second tongue portion 17b' at the outlet side path 17a of the scroll casing 17. For this reason, sudden enlargement loss at the outlet side path 17a of the scroll casing 17 is suppressed and an adverse influence on blowing performance can be minimized.

A third embodiment of the present invention will be described.

According to the first and second embodiments, the passage portions 27D, 27E, 27F, and 27G are disposed so as to pass through the outlet side path 17a of the scroll casing 17 of the blower, and therefore, when hot air heated by the heater core 22 passes through the passage portions 27D, 27E, 27F, and 27G, the hot air exchanges heat with low-temperature air flowing through the outlet side path 17a and temperature thereof is reduced. As a result, temperature of hot air blown from the passenger-seat-side foot air duct 27B, when the outside air temperature is low, may be lower than a preferable temperature in view of the heating feeling.

This problem is causes due to a duct wall of the passage portions 27D, 27E, 27F, and 27G passing through the outlet side path 17a is made of a single-layer structure of thin resin pads having a thickness of approximately 2 mm. Accordingly, in light of this point, in the third embodiment, a heat transfer coefficient at the duct wall is lowered by forming the duct wall of the passage portions 27D, 27E, 27F, and 27G in at least a double-layer duct structure and by forming an heat insulating air layer in an intermediate portion of the double-layer duct structure, thereby suppressing heat exchange between the foregoing hot air and low-temperature air to a minute amount.

Figure 14A:
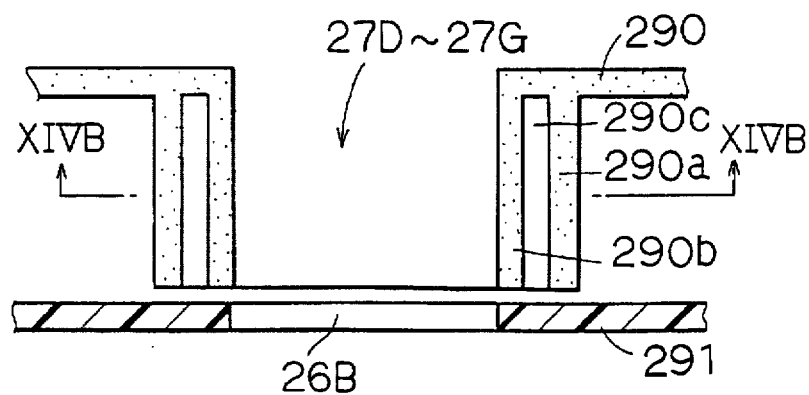
FIG. 14A is an essential cross sectional view indicating a third embodiment according to the present invention.
Figure 14B:
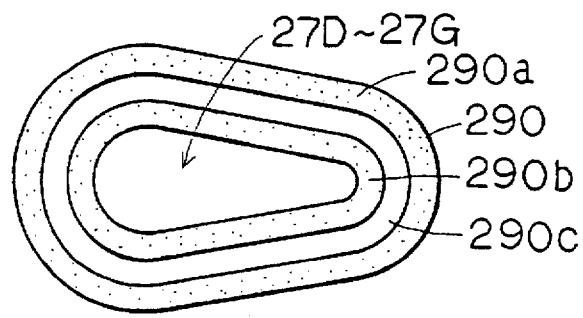
FIG. 14B is a cross sectional view taken along line XIVB—XIVB of FIG. 14A.

That is, according to the third embodiment, the resin lower case 29b shown in FIG. 6 is separated into an upper-side first case 290 and a lower-side second case 291 as shown in FIG. 14, and the upper-side first case 290 is formed in a multiple-layer cross-sectional shape of two layers so as to be joined on the lower-side second case 291. By adopting this structure, an heat insulating air layer 290c is formed between an outer peripheral wall 290a and an inner peripheral wall 290b of the upper-side first case 290.

By forming the heat insulating air layer 290c, the heat transfer coefficient at the duct wall of the passage portions 27D through 27G is lowered, and heat exchange between the hot air and low-temperature air can be suppressed to a minute amount.

According to experimentation and study by the inventors, when the duct wall of the passage portions 27D through 27G is made of a single-layer structure of thin resin pads having a thickness of approximately 2 mm while outside air temperature is −10° C., temperature of hot air blown to within the passenger compartment declines by as much as 4° to 5° C., however, according to the third embodiment, by providing the inner and outer double-layer walls 290a and 290b having a wall-surface thickness of approximately 2 mm and forming the heat insulating air layer 290c therebetween, decline in hot air blowing temperature can be suppressed to 1° C. or less.

A fourth embodiment of the present invention will be described.

Figure 15A:
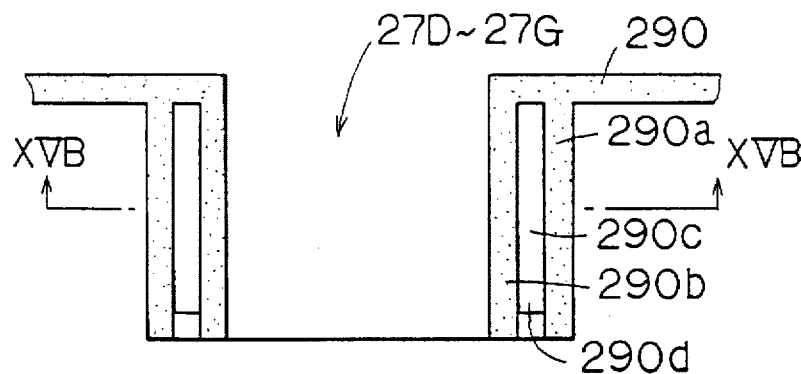
FIG. 15A is an essential sectional view indicating a fourth embodiment according to the present invention.
Figure 15B:
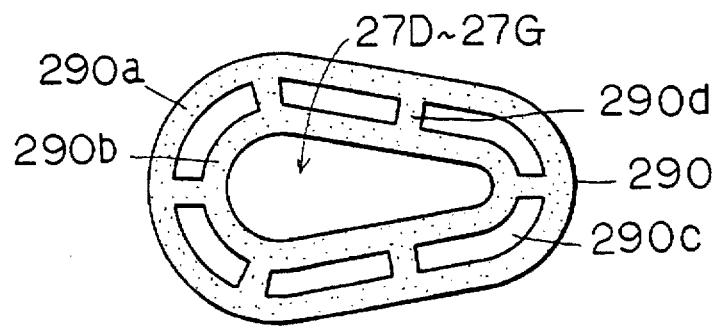
FIG. 15B is a sectional view taken along line XVB—XVB of FIG. 15A.

As shown in FIG. 15, a plurality of ribs 290d interconnected between the outer peripheral wall 290a and inner peripheral wall 290b of the upper-side first case 290 as in the above-described third embodiment are integrally formed. In this way, the rigidity of the upper-side first case 290 is improved, and the shape of the passage portions 27D through 27G (i.e., the interval between the inner and outer walls 290a and 290b) are stabilized by these ribs 290d.

A fifth embodiment of the present invention will be described.

Figure 16A:
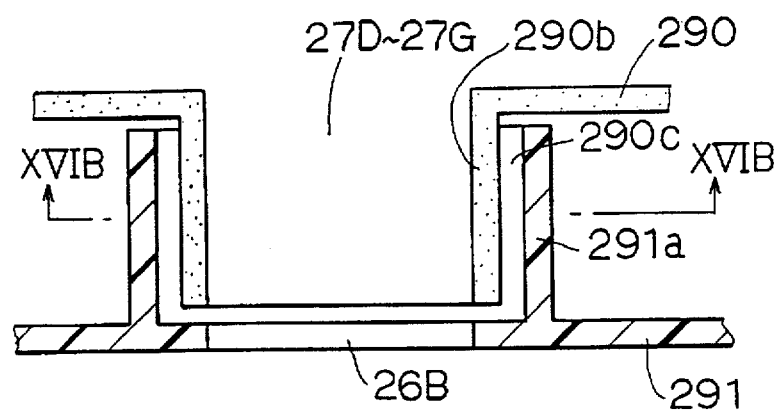
FIG. 16A is an essential cross sectional view indicating a fifth embodiment according to the present invention.
Figure 16B:
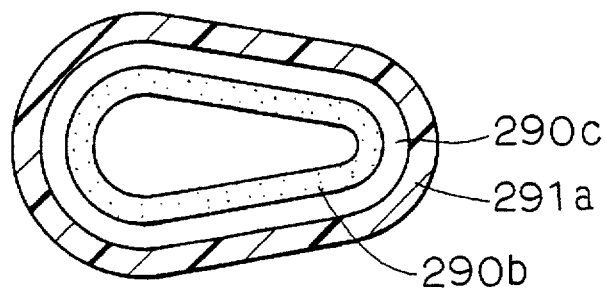
FIG. 16B is a cross sectional view taken along line XVIB—XVIB of FIG. 16A.

In the fifth embodiment, as shown in FIG. 16, an outer peripheral wall 291a corresponding to the outer peripheral wall 290a as in the third embodiment is formed on the lower-side second case 291, and the heat insulating air layer 290c is formed between the outer peripheral wall 291a and the inner peripheral wall 290b of the upper-side first case 290.

A sixth embodiment of the present invention will be described.

Figure 17A:
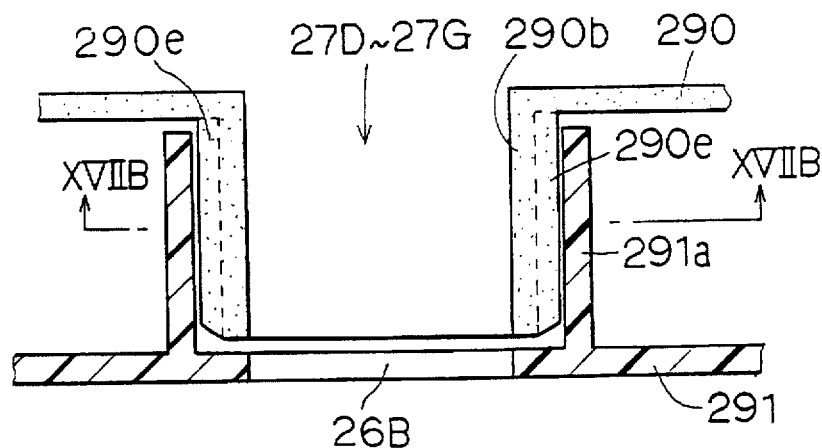
FIG. 17A is an essential sectional view indicating a sixth embodiment according to the present invention.
Figure 17B:
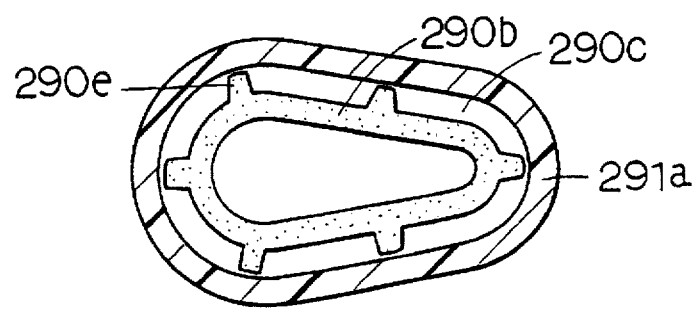
FIG. 17B is a cross sectional view taken along line XVIIB—XVIIB of FIG. 17A.

In the sixth embodiment, as shown in FIG. 17, a plurality of ribs 290e protruding to an outer peripheral side are integrally on the inner peripheral wall 290b of the upper-side first case 290, and the interval between the inner and outer walls 290a and 290b is stabilized by these ribs 290e.

Further, the present invention may be embodied in various modes other than the embodiments described and illustrated hereinabove. For example, the passage portions 27D through 27G of the passenger-seat-side foot air ductformed in formed in the lower case 29a in each of the above-described embodiments, however, it is also acceptable to form these passage portions 27D to 27G in both the lower case 29a and the middle case 29b.

Similarly, it is also acceptable for the double-layer ductwall structure of the passage portions 27D to 27G indicated in FIGS. 14 to FIG. 17 to be formed in both the lower case 29a and the middle case 29b. Needless to say, it is also acceptable for the passage portions 27D to 27G to have a multiple-layer duct-wall structure of three or more layers.

Further, an air mixing door may be employed as the device for controlling temperature instead of the flow-regulating reheating method utilizing the hot-water control valve 24, and a plate door may be utilized instead of the rotary door 23a as the device for switching passages of the air outlet mode switching portion 23.

Although the present invention has been fully described in connection with the preferred embodiments thereof with various changes and modifications will become apparent to those skilled in the art. Such changes and modifications are to be understood as being included within the scope of the present invention as defined in the appended claims.

What is claimed is:

1. An air conditioning apparatus for a vehicle having a passenger compartment, comprising:

a blower for blowing conditioned air;

a heating heat exchanger disposed substantially horizontally, into which blown air blown by said blower is introduced from a lower side thereof, for heating and discharging said blown air upwardly;

a foot air outlet opened to a foot area in said passenger compartment to supply conditioned air thereto; and a foot air duct to introduce the conditioned air heated by said heating heat exchanger from an upper portion of said heating heat exchanger to said foot air outlet, wherein, said foot air duct includes a passage portion passing through an outlet side path of said blower.

2. An air conditioning apparatus for a vehicle, according to claim 1, wherein said passage portion of said foot air duct is formed so as to have a cross section having a streamline shape along flow of blown air from said blower.

3. An air conditioning apparatus for a vehicle according to claim 1, wherein said passage portion of said foot air duct is formed in at least a double-layer duct structure, and a heat insulating air layer is formed in an intermediate portion of said double-layer duct structure.

4. An air conditioning apparatus for a vehicle according to claim 1, wherein said foot air duct is branched into plural air ducts; and said passage portion is provided in one of said plural air ducts.

5. An air conditioning apparatus for a vehicle according to claim 1, wherein said blower is provided as to be shifted from a central portion in a vehicle-width direction of an instrument panel portion in said passenger compartment; and said heating heat exchanger is disposed in said central portion.

6. An air conditioning apparatus for a vehicle according to claim 1, wherein said blower is provided with a centrifugal-type fan and a scroll casing to incorporate said centrifugal-type fan therewithin; and said passage portion is formed as to pass through an outlet side path of said scroll casing.

7. An air conditioning apparatus for a vehicle according to claim 6, wherein said passage portion is formed so as to have a cross sectional shape which is a tongue portion of said scroll casing.

8. An air conditioning apparatus for a vehicle according to claim 1, further comprising:
   a cooling heat exchanger disposed substantially horizontally below said heating heat exchanger, into which blown air blown by said blower is introduced from a lower side, to cool and discharge said blown air upwardly; and
   an air outlet mode switching portion disposed on an air downstream side of said heating heat exchanger for switching an air flow direction of air heated by said heating heat exchanger; wherein,
   said foot air duct introduces conditioned air, an air flow direction of which has been switched by said air outlet mode switching portion, into said foot air outlet.

9. An air conditioning apparatus for a vehicle according to claim 8,
   wherein said passage portion is formed as plural passage portions, and each interval of said plural passages is set in such a manner that air flow ratio to said cooling heat exchanger becomes substantially uniform.

10. An air conditioning apparatus for a vehicle according to claim 8,
    wherein said air outlet mode switching portion is disposed above said heating heat exchanger.

11. An air conditioning apparatus for a vehicle according to claim 8,
    wherein said blower is provided so as to be shifted from a central portion in a vehicle-width direction of an instrument-panel portion in said passenger compartment; and
    said cooling heat exchanger, said heating heat exchanger, and said air outlet mode switching portion are disposed in said central portion.

12. An air conditioning apparatus for a vehicle according to claim 9, further comprising:
    an inside/outside air switching box for switching inside air in said passenger compartment and outside air outside said passenger compartment to be introduced; wherein,
    said scroll casing is provided with an air inlet port and disposed substantially horizontally;
    said inside/outside air switching box is disposed above said scroll casing;
    said centrifugal-type fan blows air substantially horizontally, which has been sucked from said inside/outside air switching box through said air intake port; and
    said air outlet side path of said scroll casing is connected to an air path on an air downstream side of said cooling heat exchanger.

* * * * *

UNITED STATES PATENT AND TRADEMARK OFFICE
CERTIFICATE OF CORRECTION

PATENT NO. : 5,711,368
DATED : January 27, 1998
INVENTOR(S) : Koji Ito et al

It is certified that error appears in the above-identified patent and that said Letters Patent is hereby corrected as shown below:

Col. 2, line 20, after "interfere" insert --with--

Col. 3, line 18, delete "duct" and substitute --ducts-- therefor

Col. 3, lines 46-47, delete "so is" and substitute --is so--

Col. 4, line 2, delete "which;" and substitute --which:--

Col. 5, line 2, "panel p" should be --panel P--

Col. 5, line 10, "unit i" should be --unit 1--

Col. 5, line 42, "panel p" should be --panel P--

Col. 6, line 18, delete "omitted," and substitute --omitted;-- therefor

Col. 6, line 27, delete "rotates" and substitute --rotate-- therefor

Col. 7, line 27, delete "r0" and substitute --$r_0$-- therefor

Col. 8, lines 39-40, delete "FIG. 4)" and substitute --FIG. 4-- therefor

Col. 10, line 21, delete "an" and substitute --a-- therefor

Col. 10, line 62, delete "causes" and substitute --caused-- therefor

UNITED STATES PATENT AND TRADEMARK OFFICE
CERTIFICATE OF CORRECTION

PATENT NO. : 5,711,368
DATED : January 27, 1998
INVENTOR(S) : Koji Ito et al

It is certified that error appears in the above-identified patent and that said Letters Patent is hereby corrected as shown below:

Col. 11, line 3, delete "an" and substitute --a-- therefor (1st occurr.)

Col. 11, line 13, delete "an" and substitute --a-- therefor

Col. 11, line 61, "ductformed in" should be --duct 27B are formed--

Col. 12, line 12, delete "thereof" and substitute --thereof,-- therefor

Col. 14, line 10, Claim 12, delete "comprising;" and substitute --comprising:-- therefor Signed and Sealed this Eleventh Day of August 1998

Attest:

BRUCE LEHMAN

Attesting Officer

Commissioner of Patents and Trademarks